(12) United States Patent
Rodrigues et al.

(10) Patent No.: US 10,245,561 B2
(45) Date of Patent: Apr. 2, 2019

(54) TANGENTIAL FILTER WITH A SUPPORTING ELEMENT INCLUDING A SET OF CHANNELS

(71) Applicant: SAINT-GOBAIN CENTRE DE RECHERCHES ET D'ETUDES EUROPEEN, Courbevoie (FR)

(72) Inventors: Fabiano Rodrigues, Roussillon (FR); Ronald Neufert, Michelau (DE); Malte Moeller, Rödental (DE); Adrien Vincent, Cabannes (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 149 days.

(21) Appl. No.: 15/312,997

(22) PCT Filed: May 21, 2015

(86) PCT No.: PCT/FR2015/051342
§ 371 (c)(1),
(2) Date: Nov. 21, 2016

(87) PCT Pub. No.: WO2015/177476
PCT Pub. Date: Nov. 26, 2015

(65) Prior Publication Data
US 2017/0182468 A1    Jun. 29, 2017

(30) Foreign Application Priority Data
May 22, 2014 (FR) ...................................... 14 54637

(51) Int. Cl.
*B01D 71/02* (2006.01)
*B01D 63/06* (2006.01)
(Continued)

(52) U.S. Cl.
CPC ............. *B01D 71/02* (2013.01); *B01D 39/20* (2013.01); *B01D 46/0002* (2013.01); *B01D 63/066* (2013.01); *B01D 69/046* (2013.01)

(58) Field of Classification Search
CPC .... B01D 39/20; B01D 46/0002; B01D 71/02; B01D 63/066; B01D 69/046
See application file for complete search history.

(56) References Cited

U.S. PATENT DOCUMENTS 5,454,947 A    10/1995  Olapinski et al.
6,077,436 A     6/2000  Rajnik et al.
(Continued)

FOREIGN PATENT DOCUMENTS

DE    198 54 319 A1    5/2000
EP      0 686 424 A1   12/1995
(Continued)

OTHER PUBLICATIONS

International Search Report as issued in International Patent Application No. PCT/FR2015/051342, dated Sep. 8, 2015.

*Primary Examiner* — John Kim
(74) *Attorney, Agent, or Firm* — Pillsbury Winthrop Shaw Pittman LLP

(57) ABSTRACT

A tangential filter for filtration of a fluid includes a support element, wherein, along a transverse plane perpendicular to the central axis of the support element a) the support element includes in its central portion only inner channels that do not share a common wall with its outer surface, the inner channels having a substantially equivalent hydraulic diameter, b) the support element includes peripheral channels, including at least first and second adjacent peripheral channels, each of the two channels sharing a common wall with the outer surface, c) the ratio of the hydraulic diameter of the first channel to the hydraulic diameter of the second channel is greater than or equal to 1.1, d) the number of peripheral (Continued)

first channels is greater than or equal to the number of peripheral second channels, e) the second channel has a hydraulic diameter substantially identical to the hydraulic diameter of the inner channels.

19 Claims, 4 Drawing Sheets

(51) Int. Cl.
- *B01D 69/04* (2006.01)
- *B01D 39/20* (2006.01)
- *B01D 46/00* (2006.01)

(56) References Cited

U.S. PATENT DOCUMENTS

| | | | |
|---|---|---|---|
| 7,699,903 B2 | 4/2010 | Stobbe et al. | |
| 2008/0296217 A1* | 12/2008 | Thoraval | B01D 63/066 210/484 |

FOREIGN PATENT DOCUMENTS

| | | |
|---|---|---|
| EP | 0 778 073 A1 | 6/1997 |
| EP | 0 778 074 A2 | 6/1997 |
| EP | 0 780 148 A1 | 6/1997 |
| FR | 2 876 922 A1 | 4/2006 |
| WO | WO 00/29098 | 5/2000 |
| WO | WO 01/62370 A1 | 8/2001 |
| WO | WO 02/45831 A1 | 6/2002 |

* cited by examiner

TANGENTIAL FILTER WITH A SUPPORTING ELEMENT INCLUDING A SET OF CHANNELS

CROSS-REFERENCE TO RELATED APPLICATIONS

This application is the U.S. National Stage of International Application Serial No. PCT/FR2015/051342, filed May 21, 2015, which in turn claims priority to French Application No. 1454637, filed May 22, 2014. The contents of all of these applications are incorporated herein by reference in their entirety.

The invention relates to the field of filtering structures made of an inorganic material intended for the filtration of liquids, in particular the structures coated with a membrane in order to separate particles or molecules from a liquid, more particularly from water, especially from process water resulting from the extraction of petroleum or shale gases.

Filters that use ceramic or non-ceramic membranes for filtering various fluids, especially polluted waters, have long been known. These filters may operate according to the principle of frontal (dead-end) filtration, this technique involving passing the fluid to be treated through a filter media, perpendicular to its surface. This technique is limited by the accumulation of particles and the formation of a cake at the surface of the filter media, and gives rise to a rapid drop in performance and also a decrease in the filtration level.

According to another technique to which the present invention relates, use is made of tangential (crossflow) filtration which, on the contrary, makes it possible to limit the accumulation of particles, owing to the longitudinal circulation of the fluid at the surface of the membrane. The particles remain in the circulating flow while the liquid can pass through the membrane under the effect of the pressure. This technique ensures stability of the performance and of the filtration level.

The strong points of tangential filtration are therefore its ease-of-use, its reliability owing to the use of organic and/or inorganic membranes of porosity suitable for carrying out said filtration, and its continuous operation.

Tangential filtration requires little or no adjuvant and provides two separate fluids that may both be reusable: the concentrate (also referred to as retentate) and the filtrate (also referred to as permeate): it is a clean, environmentally friendly process.

Tangential filtration techniques are especially used for microfiltration, ultrafiltration and nanofiltration.

Many structures of filters that operate according to the principles of tangential filtration are thus known from the current art. They comprise or are constituted from tubular supports made of a porous inorganic material that are formed of walls that delimit longitudinal channels parallel to the axis of said supports. The filtrate passes through the walls then is discharged at the peripheral outer surface of the porous support.

The surface of said channels is also customarily covered with a membrane, preferably made of a porous inorganic material, referred to as a membrane or membrane separation layer in the present description, the nature and the morphology of which are suitable for stopping the molecules or the particles having a size that is close to or greater than the median diameter of the pores of said membrane when the fluid filtered spills into the porosity of the porous support. The membrane is conventionally deposited on the inner surface of the channels by a process for coating a slurry of the porous inorganic material followed by a consolidating heat treatment, especially a drying and optionally a sintering of the ceramic membranes.

In such structures, one of the most critical parameters consists in positioning and sizing the channels in order to limit as much as possible the pressure drop across the filter, and very particularly the transmembrane pressure, that is to say the difference that exists between the pressure of the initial fluid on the feed side and the pressure of the fluid at the outlet, on the filtrate side of the membrane. It is thus possible to reduce the energy consumption of the recirculation pumps while promoting the production of a large amount of filtrate, the filtration system preferably operating in turbulent regime in order to avoid excessively rapid clogging of the channels. Various geometries have been proposed in the art for limiting said pressure drop and in particular the transmembrane pressure in such structures. Notably, multichannel structures have been proposed, which have a non-circular cross section in a sectional plane perpendicular to the axis of the support. All these modifications are moreover aimed at increasing the total filtration surface area of the filter relative to the overall volume of the porous support used.

By way of example, publication U.S. Pat. No. 5,454,947 proposes structures, the channels of which have a non-circular cross section, with larger channels at the periphery and thicker radial walls in the direction of the periphery of the filter, for the purpose of increasing the contribution of the inner channels and thus promoting the transfer of the permeate to the outside of the filter.

Application EP 0 686 424 reveals a structure notably with radial walls of constant thickness in order to obtain a uniform distribution of the membrane.

Application EP 0 778 073 discloses a structure with an outer wall of variable thickness that increases in the direction of the fillets with the radial walls, in order to increase the mechanical strength of the filter.

Publication EP 0 778 074 proposes a multichannel structure comprising several channel morphologies, of which the ratio of hydraulic diameters is between 0.75 and 1.3 and of which the ratio of surface areas is between 0.75 and 1.3, in order to avoid non-uniform declogging.

Application EP 0 780 148 recommends structures with channels having a gradient of shape but that have the same hydraulic diameter.

WO 00/29098 and WO 01/62370 propose a configuration with a particular arrangement of channels having bases in the shape of a third of a circle and/or of various quadrilaterals in order to increase the ratio of the surface area exposed to the fluid along the channels to the flow area i.e. the channel surface area in the transverse sectional plane perpendicular to the axis of the filter.

U.S. Pat. No. 7,699,903 B2 describes membrane separation layers, and also the deposition conditions thereof in tangential filtration structures. Reference may in particular be made to this publication for further details regarding obtaining and depositing membrane separation layers within the meaning of the present invention.

All the above modifications aim to obtain a filter having optimal properties for the application and in particular:

a low pressure drop and, constantly, an internal flow in turbulent regime in order to limit the clogging of the filter and the blocking of the channels, owing to the pressure of the fluid and to the shear generated at the walls of the channels circulating therein, a geometry of channels enabling a velocity profile of the outgoing flow (permeate) that is as high and as uniform as possible from one channel to another in the sectional plane of the filter, a high mechanical strength and in particular a high abrasion resistance, the most long-lasting filtration performance possible.

In particular, there is still a need for a filtering structure that has even greater filtration efficiency, in particular a sufficient filtrate flow rate over the longest possible filtration time, without blocking the filter. The studies carried out by the applicant company have shown in particular a noticeable correlation between such filtration efficiency, the configuration of the channels, in particular of the most peripheral channels, and the distribution of the membrane separation layer deposited on the inner surface of the channels.

In particular, a close relationship has been demonstrated by the applicant company's studies, described below, between the filtration capacity of the structure (measured by the flow rate of filtrate obtained at a given transmembrane pressure within the filter) and the configuration of the channels (size and shape), in particular of the most peripheral channels, relative to the degree of uniformity of the thickness of said membrane separation layer within said channels.

In its most general form, the present invention thus relates to a tangential filter for the filtration of a fluid such as a liquid, comprising or consisting of a support element made from a porous, preferably non-oxide, inorganic material. Said element has a tubular shape delimited by an outer surface and comprises in its inner portion a set of channels, having axes that are parallel to one another and separated from one another by walls of said porous inorganic material. The filter according to the invention comprises a central portion that comprises only inner channels Ci connected to one another by elements of common porous walls, and peripheral channels Cp, i.e. channels having a common wall with the outer surface of the support element. According to the invention, said inner and peripheral channels are covered over their inner surface with a membrane separation layer intended to come into contact with said fluid to be filtered circulating therein and the inner channels have a substantially equivalent hydraulic diameter. A tangential filter according to the present invention corresponds to the following criteria, along a transverse plane P perpendicular to the central axis of said tubular support:

a) the support comprises at least two adjacent peripheral channels A and B of different hydraulic diameter, each of said two peripheral channels A and B sharing a common wall with said outer surface, b) the ratio Dh of:
the hydraulic diameter $Dh_A$ of the first channel A to
the hydraulic diameter $Dh_B$ of the second channel B, is greater than or equal to 1.1, c) the number of peripheral channels B is greater than or equal to the number of peripheral channels A.

The tangential filter, along a transverse plane P perpendicular to the central axis of said tubular support may very particularly have the following features:

a) said support comprises in its central portion only inner channels $C_i$ that do not share a common wall with its outer surface, said inner channels having a substantially equivalent hydraulic diameter, b) said support additionally comprises peripheral channels Cp, defining the outer ring of channels of said support, including at least two adjacent peripheral channels A and B, each of said two channels A and B sharing a common wall (6, 7) with said outer surface (2), c) the ratio $D_h$ of:
the hydraulic diameter $D_{hA}$ of the first channel A to
the hydraulic diameter $D_{hB}$ of the second channel B, is greater than or equal to 1.1, d) the number of peripheral channels B is greater than or equal to the number of peripheral channels A, e) the channel B has a hydraulic diameter $Dh_B$ substantially identical to the hydraulic diameter of the inner channels ($C_i$).

A tangential filter according to the present invention may also have the following preferred features, each of the features described below possibly, of course and where appropriate, being combined either with one other or with several others:

The channel B has a hydraulic diameter $Dh_B$ substantially identical to the hydraulic diameter of the inner channels (Ci).

The channel B is the peripheral channel that has the smallest hydraulic diameter $Dh_B$.

The first peripheral channel A is of non-circular shape. It has at least one concave or convex wall, or even at least one concave and convex wall. These wall shapes make it possible to increase the filtration surface area. Preferably, the first channel has a flared shape, for example in the shape of a drop or a bottle, such that its surface extends mainly in the direction of the central axis of the filtering support so as to overlap with the closest ring of non-peripheral channels. In particular, the surface of the channel A of flared or elliptical shape, along the transverse plane P, extends mainly along an axis from the periphery of the support element to its central axis. Advantageously, the surface of the common wall between the channel A and the outer surface is curved. More advantageously still, said outer surface is curved so as to obtain an outer wall of substantially constant thickness.

Along the transverse plane P, the inner channels (Ci) and preferably the channel B have a substantially elliptical cross section, the ratio of the large axis to the small axis of the ellipse being between 2 and 1, preferably between 1.5 and 1 and very preferably between 1.2 and 1.

The second peripheral channel B has a substantially circular cross section. Its diameter is advantageously between 1 and 7 mm, preferably between 2 and 5 mm.

The channel B of smaller hydraulic diameter has, along said transverse plane P, a shape substantially equivalent to that of said inner channels.

The inner channels (Ci) have a substantially circular cross section, along said transverse plane P.

The surface of the common wall between the channel A and the outer surface is curved.

The ratio Dh of the hydraulic diameter $Dh_A$ of the first channel A to the hydraulic diameter $Dh_B$ of the second channel B is less than 2, preferably is less than 1.5 and more preferably is less than 1.4.

The mean thickness of the outer wall of the peripheral channels is preferably between 0.2 and 1.5 mm, preferably between 0.5 and 1.2 mm. Such a thickness makes it possible in particular to combine a good mechanical strength and a high permeate flow rate.

The ratio $R_s$ of the surface areas $S_A$ and $S_B$ of the two adjacent peripheral channels A and B ($R_s = R_{SA}/R_{SB}$)) is preferably between 1.1 and 3.5, more preferably is between 1.2 and 2.5 and more preferably still is between 1.4 and 2.3.

The hydraulic diameter of the inner channels is less than 7 mm, and preferably between 1 and 5 mm, more preferably between 1.5 and 4.5, or even between 2 and 4 mm.

The central portion of the support element comprises only channels Ci sharing between them porous wall elements.

The central portion comprising only inner channels represents, along a transverse sectional plane of the filter, at least 20% of the surface area of the support along said section, and preferably at least 30%, or even at least 50% or even more than 60% of said surface area, along said section.

The combined surface area occupied by the inner channels, along a transverse sectional plane of the filter, represents at least 10% of the total surface area of the support along said section, and preferably at least 20%, or even at least 30% or even more than 50% of said total surface area, along said section.

The number of inner channels Ci is greater than the number of channels B.

The support element comprises in its peripheral ring only channels A and channels B.

The support element comprises in its peripheral ring only a single configuration (a single type) for the channels A and only a single configuration (a single type) for the channels B.

The support element has a polygonal base or a circular base.

At least one inner channel Ci does not share a common wall with a peripheral channel A.

The support element has, along a transverse section, an equivalent diameter of between 20 and 80 mm. The equivalent diameter is understood to mean the diameter that a circle of the same area as the cross section in question of the support element, along said transverse sectional plane, would have.

The porosity of the material constituting the porous support is between 20% and 60%.

The median pore diameter of the material constituting the porous support is between 5 and 50 micrometers, preferably greater than 5 micrometers and less than 50 micrometers, more preferably between 10 and 40 micrometers.

The porous support comprises and preferably consists of a ceramic material, preferably a non-oxide ceramic material, preferably selected from silicon carbide SiC, in particular liquid-phase or solid-phase sintered SiC, recrystallized SiC, silicon nitride, in particular $Si_3N_4$, silicon oxynitride, in particular $Si_2ON_2$, silicon aluminum oxynitride, or a combination thereof. Preferably, the support consists of silicon carbide, more preferably still of recrystallized SiC.

The internal surface area of the channels of the filtering support is coated with a membrane separation layer essentially consisting of a ceramic material, preferably based on a non-oxide ceramic, preferably from the list of silicon carbide SiC, in particular liquid-phase or solid-phase sintered SiC or recrystallized SiC, silicon nitride, in particular $Si_3N_4$, silicon oxynitride, in particular $Si_2ON_2$, silicon aluminum oxynitride, boron nitride BN, or a combination thereof.

The porosity of the membrane separation layer measured by image analysis is at least 5%, preferably at least 10%, lower than that of the support. Preferably the porosity of the membrane separation layer is less than 70% and very preferably is between 10% and 70%.

The equivalent median pore diameter measured by image analysis of the layer forming the membrane separation layer is between 1 nm and 5 micrometers.

The open front area (OFA) is preferably greater than 30%, more preferably between 30% and 60%.

The filtration surface area is greater than 0.35, preferably greater than 0.4 $m^2/m$ of filter length.

Within the meaning of the present invention, the following definitions are given:

An inner channel (Ci) is understood for the purposes of the invention to mean the channels that do not share a common wall with the outer surface of the support element. As indicated above, the set of inner channels delimits the inner portion of the support or of the filter, excluding the peripheral ring comprising the channels A and B.

In a complementary manner, a peripheral channel (Cp) has at least one common wall with the outer surface of the support element and so is referred to as peripheral. According to the invention, the peripheral channels A and B delimit a peripheral (or outer) ring of the support or of the filter.

A substantially equivalent hydraulic diameter of the channels is understood for the purposes of the invention to mean that the ratio of the hydraulic diameter between said channels varies at most between 0.95 and 1.05.

The internal surface area ($S_A$ or $S_B$) of a channel is understood to mean the area (in $mm^2$) of the flow area of said channel, along a transverse plane.

The hydraulic diameter $D_h$ of a channel is calculated, in any transverse sectional plane P of the tubular structure, from the surface area of the cross section of the channel S of said channel and from its perimeter P, along said sectional plane and by applying the following conventional expression:

$$D_h = 4 \times S/P$$

The expression "more uniform distribution of the membrane separation layer" is understood to mean the fact that in a transverse plane P of the tubular structure, the ratio of the mean thicknesses of said layer measured respectively on a first type of channel A and on a second type of channel B is closer to 1.

A ring of channels is understood to mean a set of channels located substantially at the same distance from the central axis of the filtering support.

Following this definition, the peripheral ring is, within the meaning of the invention, the outermost ring of channels, which comprises the channels A and B.

The same configuration or same type of channels is defined by channels having substantially the same shape and the same surface area in the transverse sectional plane P, for example to within plus or minus five percent. They may be located on different rings or on the same ring of channels.

The OFA (open front area) is obtained by calculating the ratio, as a percentage, of the area covered by the sum of the transverse cross sections of the channels to the total area of the corresponding transverse cross section of the porous support.

The porosity and the median diameter of the porous support described in the present description are determined in a known manner by mercury porosimetry.

The pore volume is measured by mercury intrusion at 2000 bar using a Micromeritics AutoPore IV 9500 Series mercury porosimeter, on a 1 $cm^3$ sample taken from a block of the product, the sampling region excluding the skin typically extending up to 500 microns from the surface of the block. The applicable standard is ISO 15901-1.2005 part 1. The increase in pressure up to high pressure results in "pushing" the mercury into pores of increasingly small size. The intrusion of mercury is conventionally carried out in two steps. In a first step, mercury intrusion is carried out at low pressure up to 44 psia (around 3 bar), using air pressure to introduce the mercury into the largest pores (>4 μm). In a second step, high-pressure intrusion is carried out with oil up to the maximum pressure of 30 000 psia (around 2000 bar).

By applying the Washburn equation mentioned in the ISO 15901-1.2005 part 1 standard, a mercury porosimeter thus makes it possible to establish a size distribution of the pores by volume. The median pore diameter of the porous walls corresponds to a threshold of 50% of the population by volume.

The porosity of the membrane, corresponding to the total volume of the pores in the membrane, and the median pore diameter of the membrane are advantageously determined according to the invention with the aid of a scanning electron microscope. For example, polished cross sections of a wall of the support in transverse cross section are produced, as illustrated by the appended FIG. 7, so as to visualize the entire thickness of the coating over a combined length of at least 1.5 cm. The images are acquired from a sample of at least 50 grains. The area and the equivalent diameter of each of the pores are obtained from images by conventional image analysis techniques, optionally after a binarization of the image that aims to increase the contrast thereof. A distribution of equivalent diameters is thus deduced, from which the median diameter is extracted.

Similarly, it is possible to determine by this method a median size of the particles constituting the membrane layer.

The median size of the particles constituting the membrane layer is in general between 20 nanometers and 10 micrometers, preferably between 100 nanometers and 2 micrometers.

Within the meaning of the present description and unless otherwise mentioned, the median diameter of the particles or of the pores respectively denotes the diameter of the particles or of pores below which 50% by number of the population is found. As already indicated above, the median diameter of pores within the membrane is obtained by image analysis and calculated from a distribution of the pores by number. The median pore diameter of the support is determined on the basis of a distribution by volume, as measured by conventional mercury porosimetry techniques.

Within the meaning of the present invention, all the channels of the structure, in particular the channels of type A and the channels of type B, of course have a cross section and a distribution that are substantially constant and identical over the entire length of the filter, irrespective of the transverse sectional plane P.

Liquid-phase sintering is understood to mean a sintering in which at least one of the sintering additives, several additives or else a phase formed from the combination of some of these additives, or even some impurities of the product to be sintered, are capable of forming a liquid phase during the sintering heat treatment, in an amount such that it is sufficient to enable the rearrangement of the grains and thus bring them into contact with one another. Solid-phase sintering is a sintering in which none of the sintering additives, or else no phase formed from the combination of some of these additives, or even no impurity of the product to be sintered are capable of forming a liquid phase such that it is sufficient to enable the rearrangement of the grains and to thus bring them into contact with one another.

A sintering additive is understood to mean a compound that is customary known for enabling and/or accelerating the kinetics of the sintering reaction.

An example is given below for producing a tangential filter according to the invention, that of course does not limit the processes for obtaining such a filter:

According to a first step, the filtering support is obtained by extruding a paste through a die configured according to the geometry of the structure to be produced according to the invention. The extrusion is followed by a drying and a firing in order to sinter the inorganic material constituting the support and to obtain the porosity and mechanical strength characteristics necessary for the application.

For example, when it is a question of an SiC support, it may in particular be obtained according to the following manufacturing steps:
  mixing a mixture comprising particles of silicon carbide of purity greater than 98% and having a particle size such that 75% by mass of the particles has a diameter of greater than 30 micrometers, the median diameter by mass of this particle size fraction (measured by laser particle size analysis) being less than 300 micrometers. The mixture also comprises an organic binder of the type derived from cellulose. Water is added and mixing is continued until a homogeneous paste is obtained, the plasticity of which allows extrusion, the die being configured for obtaining monoliths according to the invention.
  microwave drying of the green monoliths for a sufficient time to bring the content of water that is not chemically bound to less than 1% by mass.
  firing up to a temperature of at least 1300° C. in the case of a filtering support based on liquid-phase sintered SiC, silicon nitride, silicon oxynitride, silicon aluminum oxynitride or even BN and of at least 1900° C. and below 2400° C. in the case of a filtering support based on recrystallized or solid-phase sintered SiC. In the case of a nitride or oxynitride filtering support, the firing atmosphere is preferably a nitrogen-containing atmosphere. In the case of a recrystallized SiC filtering support, the firing atmosphere is preferably inert and more particularly argon. The temperature is typically maintained for at least 1 hour and preferably for at least 3 hours. The material obtained has an open porosity of 20% to 60% by volume and a median pore diameter of the order of 5 to 50 micrometers.

The filtering support is then coated according to the invention with a membrane (or membrane separation layer). One or more layers, referred to as primer layers, may be deposited before forming the filtering membrane according to various techniques known to a person skilled in the art: techniques for deposition using suspensions or slurries, chemical vapor deposition (CVD) techniques or thermal spraying, for example plasma spraying, techniques.

Preferably, the primer layers and the membrane are deposited by coating using slurries or suspensions. A first layer is preferably deposited in contact with the substrate (primer layer), acting as an adhesion layer. The formulation of the primer comprises 50% by mass of SiC grains (median diameter between 2 and 20 micrometers) and 50% deionized water. A second layer of finer porosity is deposited on the primer layer, and constitutes the actual membrane. The porosity of this latter layer is suitable for giving the filtering element its final properties. The formulation of the membrane preferably comprises 50% by mass of SiC grains (in particular having a median diameter of between 0.1 and 2 micrometers) and 50% deionized water.

In order to control the rheology of these slurries and to comply with a suitable viscosity (typically between 0.01 and 1.5, preferably between 0.1 and 0.8 Pa·s under a shear gradient of $1\ s^{-1}$ measured at 22° C. according to the DINC33-53019 standard), thickeners (in proportions typically of between 0.02% and 2% of the mass of water), binders (typically between 0.5% and 20% of the mass of SiC powder), and dispersants (between 0.01% and 1% of the mass of SiC powder) may be added. The thickeners are preferably cellulosic derivatives, the binders are preferably PVAs or acrylic derivatives and the dispersants are preferably of ammonium polymethacrylate type.

Organic additions expressed by weight of the slurry, in particular Dolapix A88 as deflocculant for example in a proportion of 0.01% to 0.5%, Tylose for example of MH4000P type as thickener in a proportion of 0.01% to 1%, PVA as bonding agent in an amount of 0.1% to 2% expressed by mass of solids, monoethylene glycol as plasticizer, and 95 vol % ethanol as surface tension reducer, are more particularly suitable.

These coating operations typically make it possible to obtain a primer layer having a thickness of around 30 to 40 micrometers after drying. During the second coating step, a membrane layer having a thickness of around 30-40 micrometers is obtained after drying.

The support thus coated is then dried at ambient temperature typically for at least 30 minutes then at 60° C. for at least 24 hours. The supports thus dried are then sintered at a firing temperature typically between 1700° C. and 2200° C. under a non-oxidizing atmosphere, preferably under argon, so as to obtain a membrane porosity (measured by image analysis as described above) of between 10% and 40% by volume and an equivalent median pore diameter (measured by image analysis) preferably of between 50 nm and 10 micrometers, or even between 100 nm and 5 micrometers.

The filtration membranes according to the invention preferably have the following features:

They essentially consist of a ceramic material, preferably based on a non-oxide ceramic, preferably selected from silicon carbide SiC, in particular liquid-phase or solid-phase sintered SiC or recrystallized SiC, silicon nitride, in particular $Si_3N_4$, silicon oxynitride, in particular $Si_2ON_2$, silicon aluminum oxynitride, boron nitride BN, or a combination thereof. Preferably, the membrane is based on silicon carbide that is typically recrystallized.

They are deposited on one or more layers of a primer having a porosity, in particular having a pore diameter, that is intermediate between the (greater) porosity of the walls and that of the membrane, in order to facilitate its deposition and its homogeneity. Preferably, the ratio of the mean size of the particles constituting the intermediate layer to that of the particles constituting the membrane layer is between 5 and 50. Preferably, the ratio of the mean size of the grains constituting the porous wall to that of the particles constituting the membrane intermediate layer is between 2 and 20.

The porosity of the membrane separation layer measured by image analysis is at least 5%, preferably at least 10%, lower than that of the support. Preferably, the porosity of the membrane separation layer is less than 70% and very preferably is between 10% and 70%.

The equivalent median pore diameter, measured by image analysis, of the layer forming the membrane is between 1 nm and 5 micrometers.

The figures associated with the following examples are provided in order to illustrate the invention and its advantages, without of course the embodiments thus described being able to be considered as limitations of the present invention. In the figures, and for greater clarity, the group G has been represented constituted of the two adjacent peripheral channels A and B within the meaning of the present invention.

BRIEF DESCRIPTION OF THE DRAWINGS

In the appended figures:

FIG. 1 illustrates a tangential filter 1 according to the current art, as used for filtering a fluid such as a liquid. FIG. 1 represents a schematic view of the transverse sectional plane P illustrated by FIG. 5. The filter comprises, or most often consists of, a support element 1 made of a porous, preferably non-oxide, inorganic material. The element conventionally has a tubular shape, delimited by an outer surface 2. It comprises in its inner portion 3 a set of adjacent channels 4, having axes that are parallel to one another and separated from one another by walls 8. The walls are made of a porous inorganic material that lets the filtrate pass from the inner portion 3 to the outer surface 2. The channels 4 are covered over their inner surface with a membrane separation layer 5, as illustrated by the electron microscopy image shown in FIG. 6. This membrane separation layer 5 (or membrane) comes into contact with said fluid to be filtered circulating in said channels. The channels 4 of the structure 1 may be split into various groups: all the inner channels Ci generally have a substantially equivalent hydraulic diameter and are of circular shape (in cross section) and form the central portion of the structure, within the meaning of the present invention. The filtering structure additionally comprises, around said central portion, peripheral channels Cp that occupy the outermost (or peripheral) ring of channels of the filter, said channels Cp sharing a common wall with the outer surface 2. According to a conventional configuration in which the channels have a circular shape, a minority portion of the channels (denoted by A) of the peripheral ring necessarily has a truncated shape, in order to retain a sufficient thickness of the outer wall. Even if the majority of the other peripheral channels have a circular shape (channels B in FIG. 1) identical to that of the channels Ci, the research carried out by the applicant company has shown that the presence of these peripheral channels A of restricted hydraulic diameter, even in a small number, had a negative and substantial influence on the performance and efficiency of the filtration of the filter, as will be described hereinafter.

FIGS. 2 and 3 illustrate various embodiments according to the invention of a tangential filter according to the invention, in which the structure also comprises a group G of two adjacent peripheral channels Cp A and B that share a common wall (respectively 6 and 7 in FIG. 2), with the outer surface 2, which make it possible to solve such a problem. The filter according to FIG. 2 additionally comprises inner channels Ci of substantially equivalent hydraulic diameter and of circular shape (in cross section), which together constitute the central portion of the structure, within the meaning of the present invention.

Figure 1:
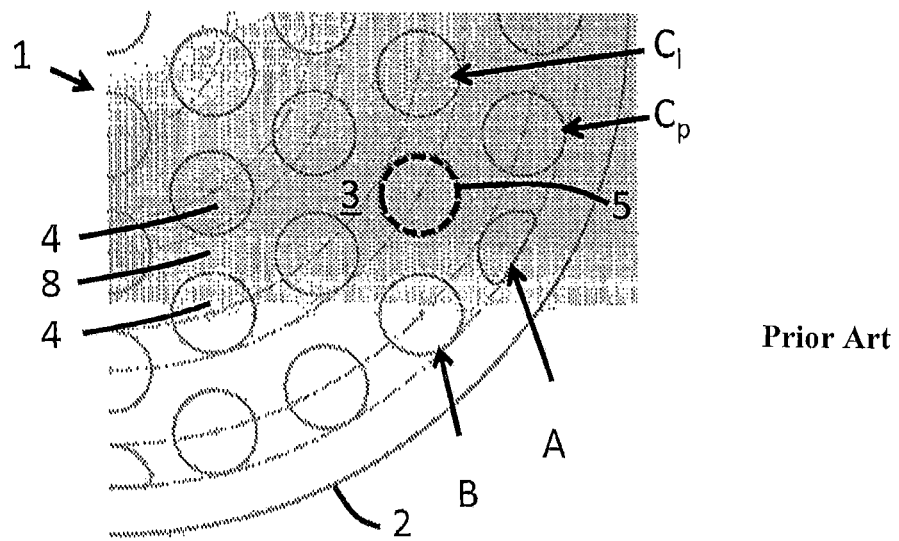
FIG. 1 illustrates a conventional configuration of a tubular filter according to the current art, along a transverse sectional plane P.
Figure 2:
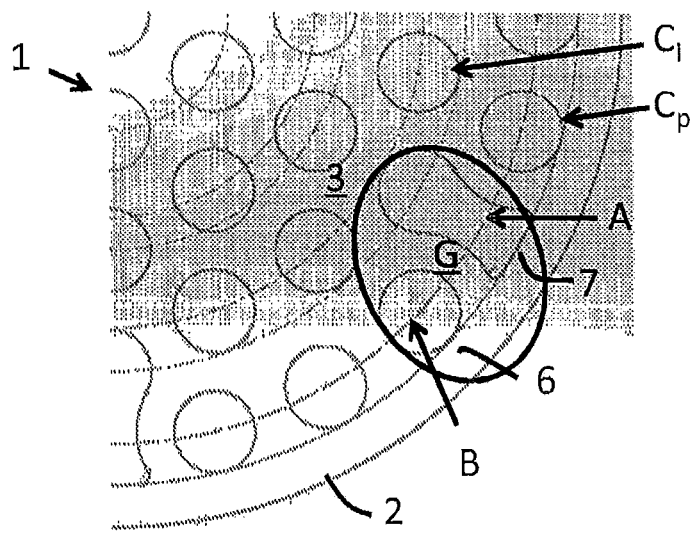
FIG. 2 schematically shows a first most advantageous configuration according to the invention.

Unlike the prior art illustrated by FIG. 1, according to FIG. 2 the channels A are configured this time in such a way that their hydraulic diameter is greater than the hydraulic diameter of the channels B of circular cross section, the latter however being present in a larger number on said peripheral ring.

Figure 3:
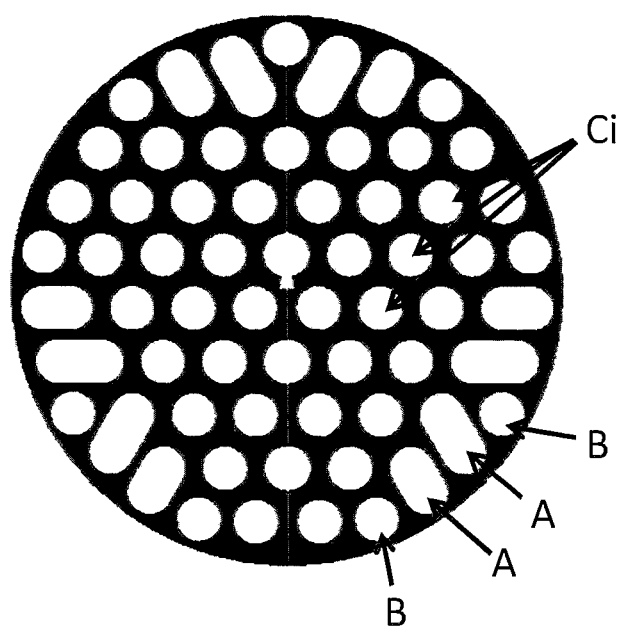
FIG. 3 schematically shows another configuration of a tubular filter according to the invention.

The filter according to FIG. 3, in accordance with the subject of the present invention, shows a configuration comprising three types of peripheral channels of different hydraulic diameter Dh. In accordance with the present invention, the number of circular peripheral channels B, the Dh of which is identical to that of the inner channels, is greater than the number of adjacent channels having a larger Dh (channels A).

Figure 4:
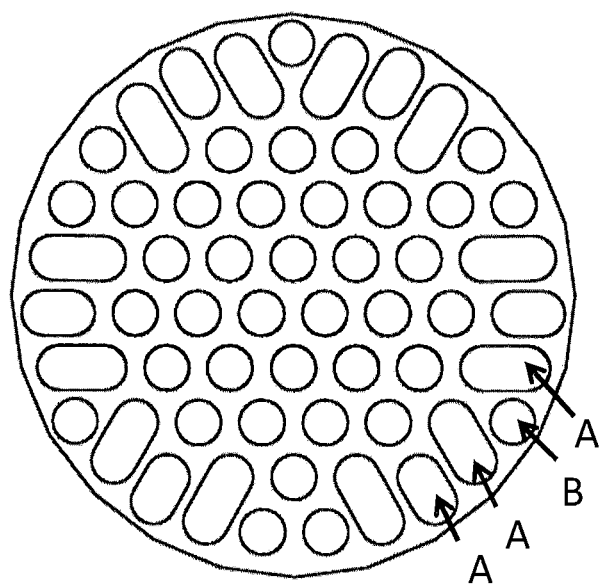
FIG. 4 illustrates an embodiment comparative to that shown schematically by FIG. 3, and not in accordance with the present invention.
Figure 5:
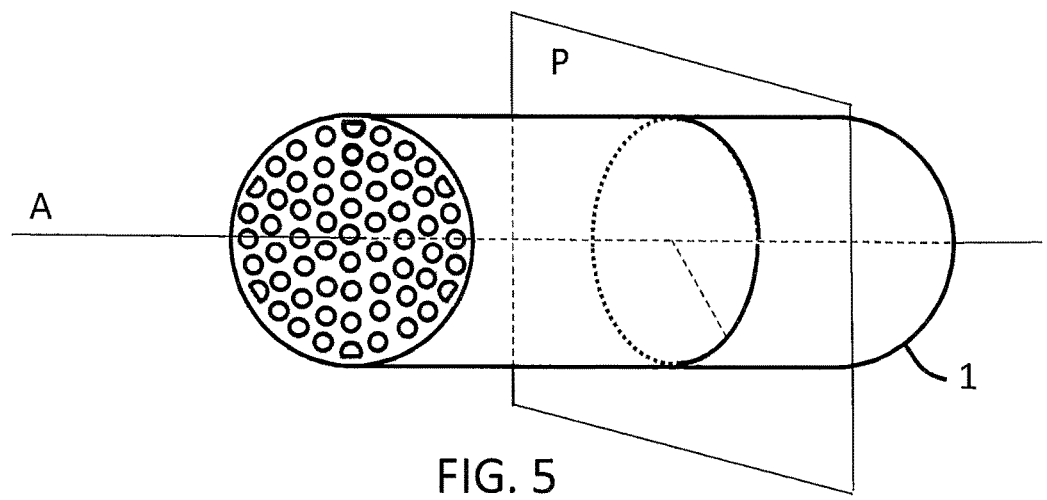
FIG. 5 illustrates the transverse sectional plane P of a filtering structure and its central axis A, within the meaning of the present invention.

On the contrary, according to the comparative configuration not in accordance described in FIG. 4, the number of peripheral channels B of smaller Dh is less than that of the adjacent channels A of larger size.

FIG. 4 therefore illustrates a comparative embodiment in which the channels A of larger hydraulic diameter this time outnumber the channels B, contrary to the requirements of the present invention.

Four filtering supports corresponding respectively to the representations according to FIGS. 1 to 4 were produced according to the techniques of the art by shaping and firing structures consisting of porous recrystallized silicon carbide, which correspond respectively to the following examples 1 to 4.

The filters according to all the examples are obtained according to the same experimental protocol below:

Mixed in a mixer are:

3000 g of a mixture of two powders of particles of silicon carbide having a purity of greater than 98% in the following proportions: 75% by mass of a first powder of particles having a median diameter of the order of 60 micrometers and 25% by mass of a second powder of particles having a median diameter of the order of 2 micrometers. (Within the meaning of the present description, the median diameter $d_{50}$ denotes the diameter of the particles below which 50% by mass of the population of said particles is found).

300 g of an organic binder of the type derived from cellulose.

Water is added in an amount of around 20% by mass relative to the total mass of SiC and of organic additive and mixing is continued until a homogeneous paste is obtained, the plasticity of which allows the extrusion of a structure of tubular shape, the die being configured for obtaining monolith blocks, the channels and the outer walls of which have a structure according to the desired configuration and as represented in appended FIGS. 1 to 4. Thus, for each configuration, 5 to 10 green supports having a diameter of 25 mm and a length of 30 cm are synthesized.

The green monoliths thus obtained are dried using a microwave system for a sufficient time to bring the content of water that is not chemically bound to less than 1% by mass.

The monoliths are then fired up to a temperature of at least 2100° C. which is maintained for 5 hours. The material obtained has an open porosity of 43% and a mean pore distribution diameter of the order of 25 micrometers, as measured by mercury porosimetry.

A membrane separation layer is then deposited on the inner wall of the channels of the support structure according to the process described below:

A primer for adhesion of the separation layer is formed, in a first step, from a slurry, the formulation of which comprises 50% by mass of SiC grains ($d_{50}$ of around 10 micrometers) and 50% deionized water.

A slurry of the material constituting the membrane filtration layer is also prepared, the formulation of which comprises 50% by mass of SiC grains ($d_{50}$ of around 0.6 micrometer) and 50% deionized water.

The rheology of the slurries was controlled at 0.5-0.7 Pa·s at 1 $s^{-1}$. In order to control the rheology of these slurries and to comply with a viscosity typically between Pa·s approximately under a shear gradient of 1 $s^{-1}$ measured at 22° C. according to the DINC33-53019 standard.

These two layers are deposited successively according to the same process described below: the slurry is introduced into a stirred tank (20 rpm). After a deaeration phase under a slight vacuum (typically 25 millibar) while maintaining the stirring, the tank is placed under a positive pressure of around 0.7 bar in order to be able to coat the inside of the support from its bottom portion up to its upper end. This operation takes only a few seconds for a 30 cm long support. Immediately after coating the slurry onto the inner wall of the channels of the support, the excess is discharged by gravity.

The supports are then dried at ambient temperature for 30 minutes then at 60° C. for 30 h. The supports thus dried are then fired at a temperature of greater than 1600° C. The firing temperature depends on the characteristics required for the final porosity of the membrane, namely a median pore diameter of around 1 micrometer and an open porosity of 40%, by volume.

Figure 6:
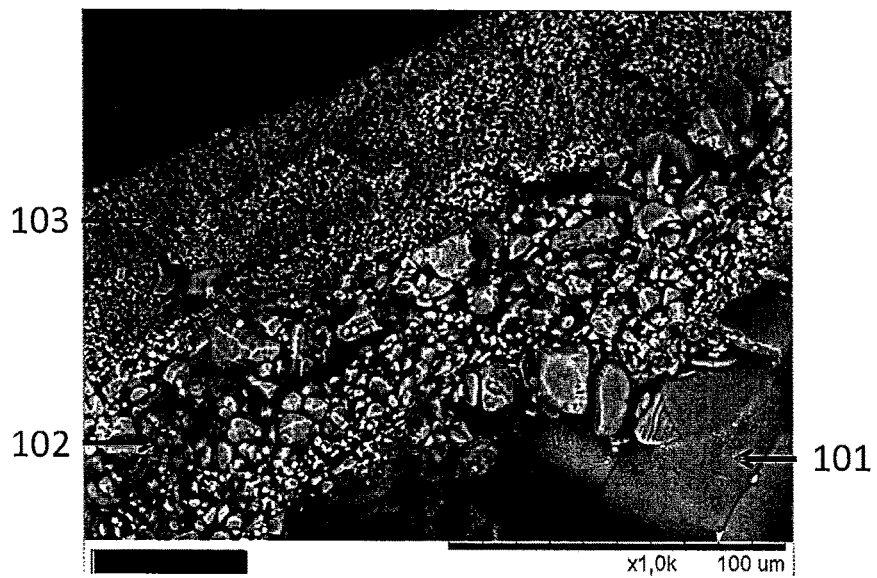
FIG. 6 is a microscopy image of a filter according to the invention, showing the membrane separation layer.

A transverse cut is made through the filters thus obtained. The structure of the membrane is observed with a scanning microscope. One of the electron microscopy images obtained is shown in FIG. 6. Observed in this figure are the porous support 100 of high porosity, the primer layer 102 that enables the adhesion of the membrane separation layer 103 of finer porosity.

On the basis of the electron microscopy images, the mean thickness of the membrane 103 on the channels A and on the channels B on the various structures according to examples 1 to 4 was measured by image analysis. The results measured are reported in table 1 below.

More particularly, reported in table 1 is the ratio of the mean thickness of the membrane (103) thus measured on all the channels A to the mean membrane thickness thus measured on all the channels B. A ratio close to 1 thus indicates an ideal distribution of the filtering inorganic material in all the channels of the filter. On the contrary, the further the ratio is from 1, the more heterogeneous the deposition of the membrane separation layer is. In table 1, the filtration surface area is calculated from the combined sum of the perimeters of all the channels of the structure.

A flow measurement is carried out on the filters according to the following method.

At a temperature of 25° C. a fluid consisting of demineralized water loaded with 300 ppm of synthetic oil feeds the filters to be evaluated under a transmembrane pressure of 0.5 bar and a circulation rate in the channels of 2 m/s. The permeate (water) is recovered at the periphery of the filter. During the test, the filter gradually clogs up due to the deposition of the oil in the channels at the surface of the separation membrane, resulting in a decrease in the amount of permeate recovered at the periphery of the filter. The flow rate is measured after 20 h of filtration. The characteristic flow rate measurement of the filter is expressed in L/min per meter of filter length after 20 h of filtration. In the table, the flow rate results have been expressed with reference to the data recorded for comparative example 1. More specifically, a value of greater than 100% indicates an increased flow rate with respect to the reference and therefore an improvement in the filtration capacity.

The comparison of the homogeneity values characterizing the structure according to example 1 (obtained according to current techniques) and the structure according to example 2 (modified according to the criteria of the present invention) shows that it is possible to substantially improve the performance of the filter by applying the principles of the present invention.

Figure 7:
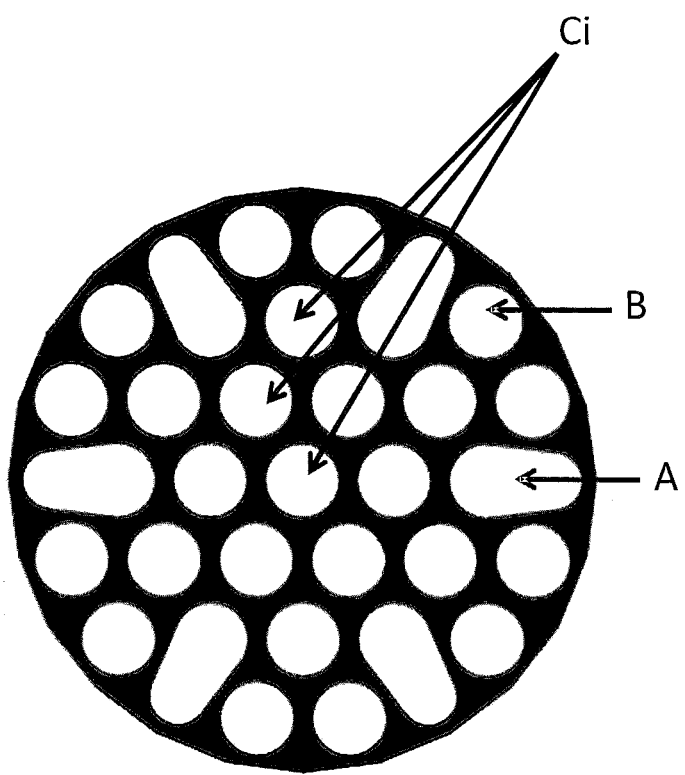
FIG. 7 schematically shows another configuration of a tubular filter according to the invention.

Specifically, the filter according to example 2 shows a substantially higher ratio of mean thickness of the mem- Represented in FIG. 7 is a transverse cross-sectional view of another filter support according to the present invention, comprising a central portion that comprises only channels Ci of circular shape along said sectional plane and peripheral channels A and B, the channel B having a cross section identical to that of the channels Ci and channels A of larger hydraulic diameter, having a flared (ovoid) shape, in the shape of a drop and the end of larger dimension of which is oriented toward the center of the filter. Such a configuration has proved particularly advantageous for maximizing the filtration surface area while preserving a sufficient wall thickness between the channels A and B for maximizing the permeate flow rate and obtaining an acceptable ratio of the mean thickness of the membranes, as measured respectively on the channels A and the channels B.

TABLE 1

|  | Filter from the art Example 1 | Example 2 (according to the invention) | Example 3 (according to the invention) | Example 4 (comparative example 4) |
|---|---|---|---|---|
| Associated FIG. | FIG. 1 | FIG. 2 | FIG. 3 | FIG. 4 |
| $S_A$ = Channel A surface area ($mm^2$) | 1.52 | 5.89 | 5.65/7.08 | 5.65/7.08/7.64 |
| $S_B$ = Channel B surface area ($mm^2$) | 3.14 | 3.14 | 3.14 | 3.14 |
| Surface area ratio $Rs = S_A/S_B$ | 0.48 | 1.87 | 1.80/2.25 | 1.80/2.25/2.43 |
| Hydraulic diameter $Dh_A$ of channel A (mm) | 1.25 | 2.41 | 2.57/2.77 | 2.57/2.77/2.83 |
| Hydraulic diameter $Dh_B$ of channel B (mm) | 2.00 | 2.00 | 2.00 | 2.00 |
| Ratio $Dh = Dh_A/Dh_B$ | 0.62 | 1.20 | 1.28/1.38 | 1.28/1.38/1.41 |
| Mean thickness of the outer wall (mm) | 1.1 | 1.1 | 0.5 | 0.6 |
| Number of channels A/number of channels B | 1/3 | 1/3 | 4/5 | 4/3 |
| Filtration surface area $m^2$/m of filter length | 0.38 | 0.37 | 0.44 | 0.42 |
| OFA % | 37 | 39 | 48 | 50 |
| Ratio of mean thickness of the membrane | 0.85 | 0.91 | 0.89 | 0.85 |
| Measurement of relative flow rate (in %) | 100 | 116 | 107 | 101 | brane than for example 1 and also a very significantly higher filtrate flow rate after 20 hours of activity.

The filter according to the embodiment of the invention illustrated by FIG. 3 (corresponding to example 3) also makes it possible to improve the homogeneity of deposition of the membrane while maintaining a permeate flow rate after 20 h that is substantially improved relative to reference example 1.

The filter according to example 4 is comparable with that of example 3 (according to the invention), the channel sizes and geometries being similar. Contrary to the requirements of the present invention, the number of peripheral channels B (of smaller hydraulic diameter) according to example/FIG. 4 is however less than the number of peripheral channels of larger hydraulic diameter (channels A). The comparison of the filtration performance of the filters according to examples 3 and 4, on the basis of the data reported in table 1, shows that it is necessary for the number of peripheral channels B of smaller size to be greater than or equal to the number of peripheral channels A of larger size, in order to obtain a homogeneous distribution of the deposition while maintaining an improved filtration capacity. Such a result appears completely unexpected in view of the current knowledge in the field of tangential filters.

The invention claimed is:

1. A tangential filter for the filtration of a fluid, comprising a support element made from a porous inorganic material, said element having a tubular shape delimited by an outer surface and comprising in its inner portion a set of adjacent channels, having axes that are parallel to one another and separated from one another by walls of said porous inorganic material, wherein said channels are covered over their inner surface with a membrane separation layer intended to come into contact with said fluid to be filtered circulating in said channels, wherein, along a transverse plane perpendicular to a central axis of said tubular support element:
   a) said support element comprises in its central portion only inner channels that do not share a common wall with its outer surface, said inner channels having a substantially equivalent hydraulic diameter,
   b) said support element additionally comprises peripheral channels, including at least two adjacent peripheral first and second channels, each of said first and second channels sharing a common wall with said outer surface, c) a ratio $D_h$ of:
   a hydraulic diameter $D_{h_A}$ of the first channel to
   a hydraulic diameter $D_{h_B}$ of the second channel,
   is greater than or equal to 1.1,
d) a number of peripheral second channels is greater than or equal to a number of peripheral first channels,
e) the second channel has a hydraulic diameter $Dh_B$ substantially identical to a hydraulic diameter of the inner channels,
   wherein at least one inner channel does not share a common wall with a peripheral first channel.

2. The tangential filter as claimed in claim 1, wherein the second channel of smaller hydraulic diameter has, along said transverse plane, a shape substantially equivalent to that of said inner channels.

3. The tangential filter as claimed in claim 1, wherein, along said transverse plane, a ratio $Rs=S_A/S_B$ of internal surface areas $S_A$ and $S_B$, respectively of the peripheral first and second channels, is between 1.1 and 3.5.

4. The tangential filter as claimed in claim 1, wherein, along said transverse plane, the inner channels and the second channel have a substantially elliptical cross section, a ratio of a large axis to a small axis of the ellipse being between 2 and 1.

5. The tangential filter as claimed in claim 4, wherein the ratio of the large axis to the small axis of the ellipse is between 1.5 and 1.

6. The tangential filter as claimed in claim 1, wherein the inner channels have a substantially circular cross section, along said transverse plane.

7. The tangential filter as claimed in claim 1, wherein the second channel has a substantially circular cross section, along said transverse plane.

8. The tangential filter as claimed in claim 1, wherein the first channel is of flared shape, or else of elliptical shape, and wherein a surface of the first channel, along said transverse plane, extends principally along an axis from a periphery of the support element to its central axis.

9. The tangential filter as claimed in claim 1, wherein the surface of the common wall between the first channel and the outer surface is curved.

10. The tangential filter as claimed in claim 1, wherein the support element has a polygonal base or a circular base.

11. The tangential filter as claimed in claim 1, wherein the support element comprises in its peripheral ring only the first and second channels.

12. The tangential filter as claimed in claim 1, wherein the porous support element comprises a material selected from silicon carbide, SiC, silicon nitride, silicon oxynitride, silicon aluminum oxynitride, or a combination thereof.

13. The tangential filter as claimed in claim 12, wherein the silicon carbide SiC is liquid-phase or solid-phase sintered SiC or recrystallized SiC, the silicon nitride is $Si_3N_4$, and the silicon oxynitride is $Si_2ON_2$.

14. The tangential filter as claimed in claim 1, wherein the membrane separation layer comprises a ceramic material.

15. The tangential filter as claimed in claim 14, wherein the ceramic material is selected from the list consisting of silicon carbide SiC, silicon nitride, silicon oxynitride, silicon aluminum oxynitride, boron nitride BN, or a combination thereof.

16. The tangential filter as claimed in claim 1, wherein a porosity of the material constituting the support element is between 20% and 60%, a median pore diameter of the material constituting the porous support being between 5 and 50 micrometers.

17. The tangential filter as claimed in claim 1, wherein an equivalent median pore diameter of the material forming the membrane separation layer is between 1 nm and 5 micrometers.

18. The tangential filter as claimed in claim 1, wherein the fluid is a liquid.

19. The tangential filter as claimed in claim 1, wherein the support element is made from a non-oxide inorganic material.

* * * * *